Oct. 29, 1963  J. G. McKAY  3,108,819
MECHANISM FOR STEADYING AND CROPPING THE ENDS OF ELONGATED STOCK
Filed March 2, 1960  3 Sheets-Sheet 1

INVENTOR.
John G. McKay,
BY
John H. Leonard,
his ATTORNEY.

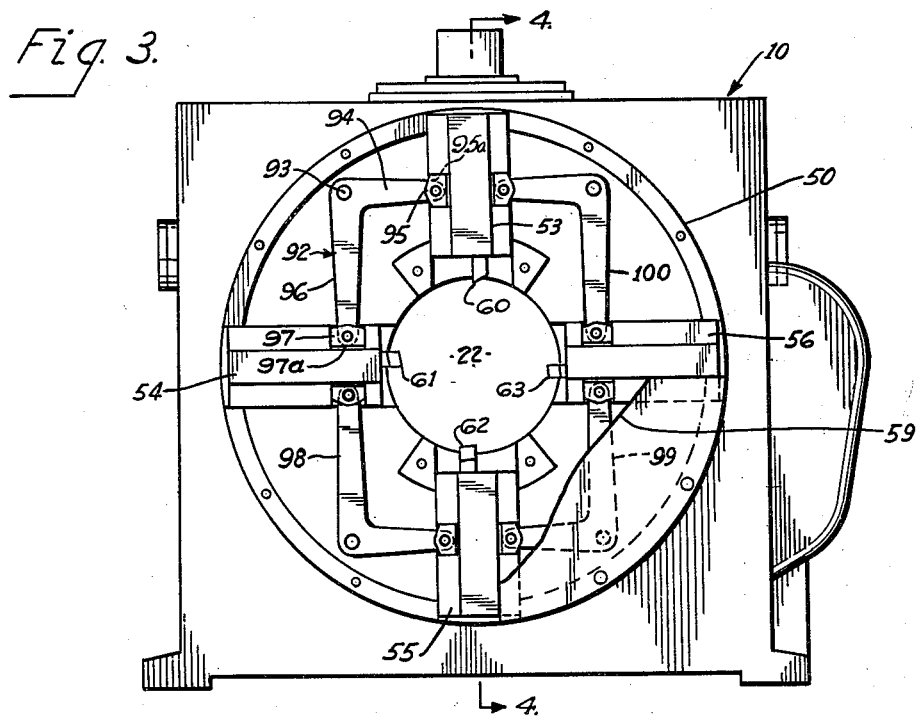
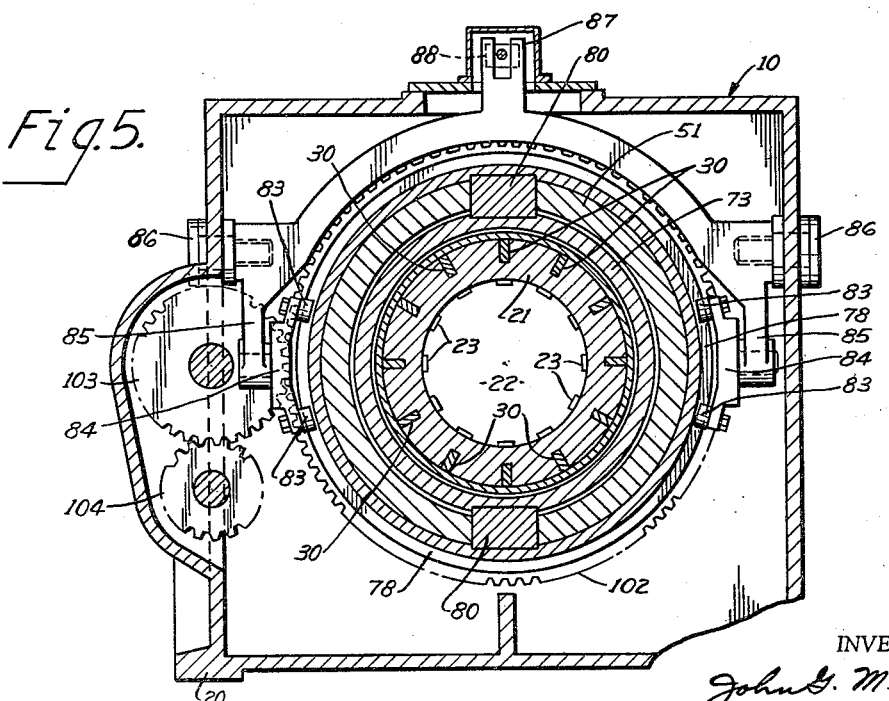

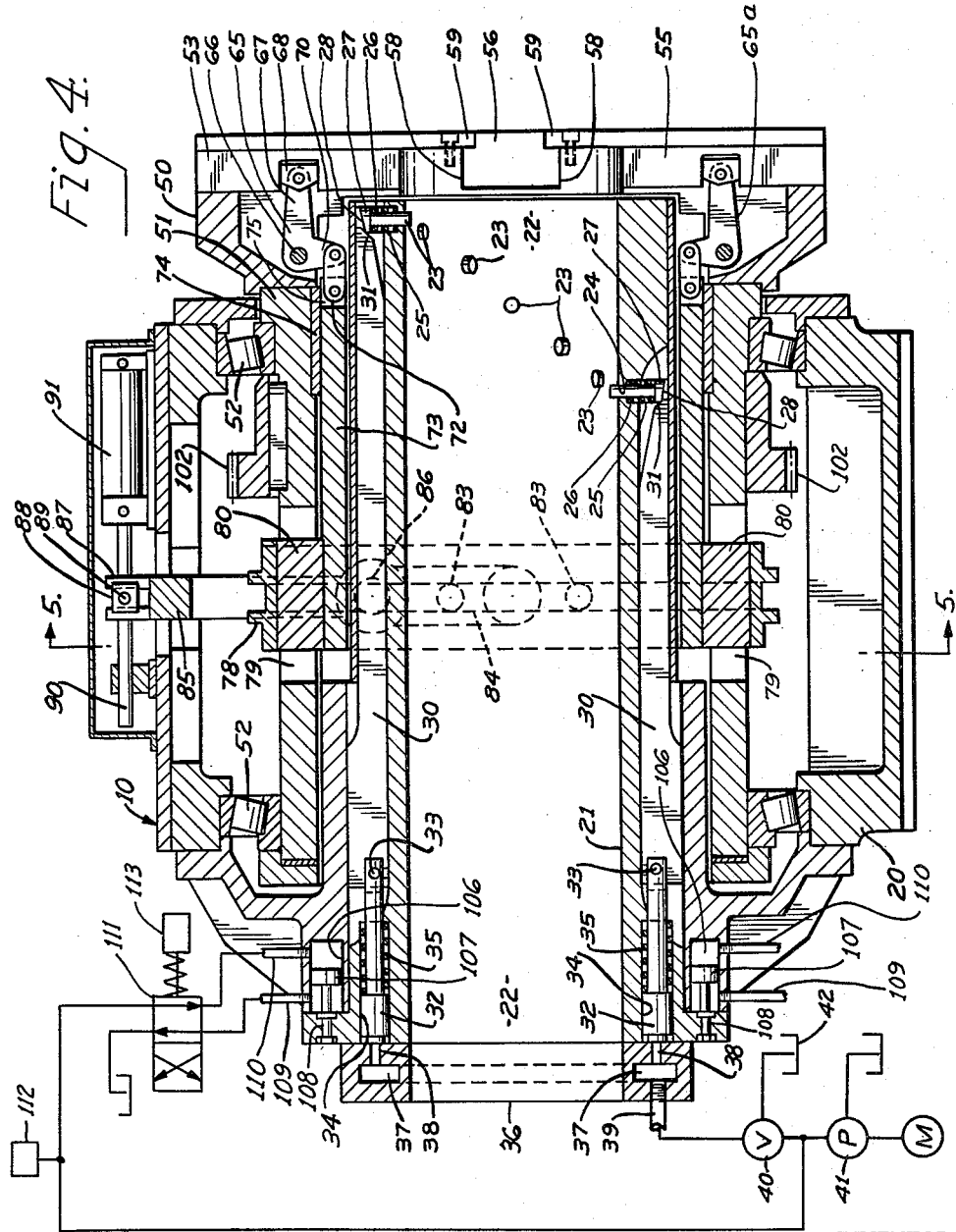

United States Patent Office 3,108,819
Patented Oct. 29, 1963

3,108,819
MECHANISM FOR STEADYING AND CROPPING THE ENDS OF ELONGATED STOCK
John G. McKay, South Euclid, Ohio, assignor to The Pipe Machinery Company, Wickliffe, Ohio, a corporation of Ohio
Filed Mar. 2, 1960, Ser. No. 12,447
5 Claims. (Cl. 279—4)

This invention relates generally to a mechanism for steadying the end portion of an elongated length of stock during cutting off of the end portion, and more specifically to a combination therewith of a mechanism for cutting off the steadied end portion and for chamfering the newly exposed end surface of the original length of stock.

For purposes of illustration, the invention is shown as embodied in a mechanism for steadying the end portion of a length of pipe during the usual cropping operation, for chamfering the newly exposed end surface of the remaining length of the pipe after cropping, and for retaining the cropped end in its steadied position until such time as a succeding length of pipe is moved into position for cropping.

Heretofore, in cropping the end portion of a pipe, it was unnecessary to steady the end portion during the cutting operation. However, the high speed cropping of a pipe with more recently developed higher speed tools causes the cropped end to vibrate and rock badly during the final stages of the cutting operation. Quite often the high speed tool breaks through the pipe wall suddenly and with the end portion of the pipe unsupported, the end sags and permits the tool to jamb so that it is broken by the pipe. Also, the unsupported end may be broken loose suddenly and thrown out from the machine with dangerous velocity.

As the cutting speeds become greater, it becomes desirable to support the cropped end portion of the pipe accurately in position during the cropping operation.

Usually, the end portion of the pipe to be removed by cropping is out of round or is bent or misaligned in some way so as not to be coaxial with the remainder of the pipe. In such instances, the conventional type of chuck cannot be used for holding the end portion to be cropped.

In accordance with the present invention, the end portion to be cropped is gripped lightly by individually positionable fingers at a large number of separated areas distributed about its periphery and along its length, so that the gripping is effective regardless of irregularities in the pipe surface due to scale, bends, concavities, axial misalignment, and the like. The end portion to be cropped is gripped lightly so as not to be distorted by the application of the gripping force yet, while so gripped, the end portion is constrained from any movement laterally of its axis out of proper position, regardless of the force applied by the end portion to the fingers in a direction opposed to the gripping force. Thus the gripping mechanism is arranged to grip the end portion to be removed and so constrain it regardless of its position or of irregularities in its contour when the pipe is in the cutting position.

Again, it is desirable to hold the cropped end portion until the cropped length of pipe is fully removed from the mechanism and a new pipe positioned for cropping.

Various specific objects and advantages will become apparent from the following description wherein reference is made to the drawings, wherein:

FIG. 3 is an enlarged right end elevation of the holding, steadying, cut-off, and chamfering mechanism illustrated in FIGS. 1 and 2;

FIG. 4 is a longitudinal cross sectional view of the mechanism illustrated in FIG. 3, and is taken on lines 4—4 thereof; and FIG. 5 is a cross sectional view taken on the line 5—5 of FIG. 4.

Figure 1:
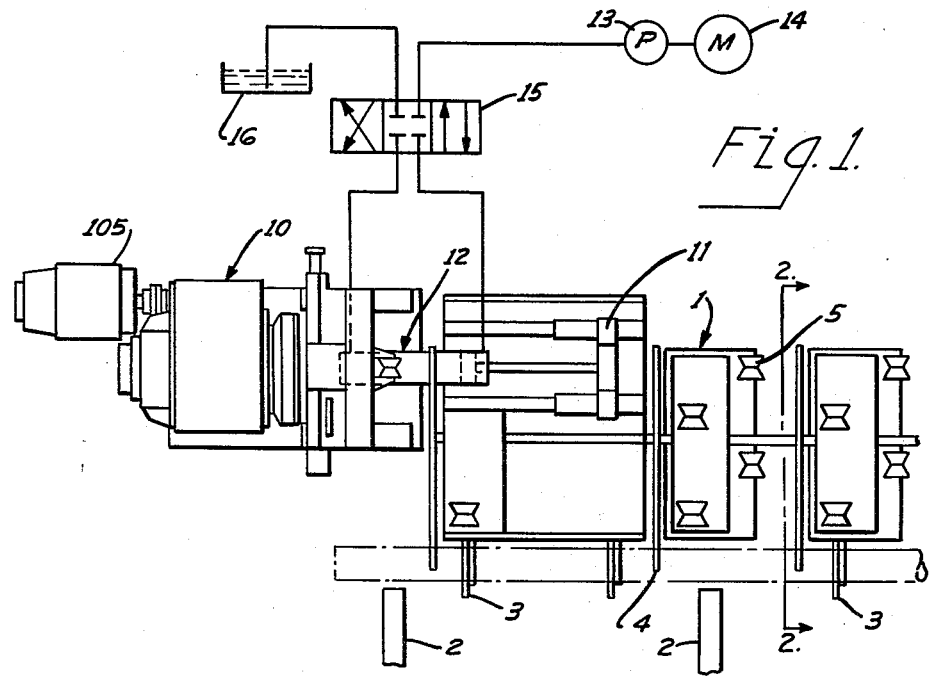
FIG. 1 is a diagrammatic top plan view showing a holding, steadying, cut-off and chamfering mechanism embodying the principles of the present invention in cooperative relation with a pipe holding chuck, and arranged for cropping the end of a length of pipe.
Figure 2:
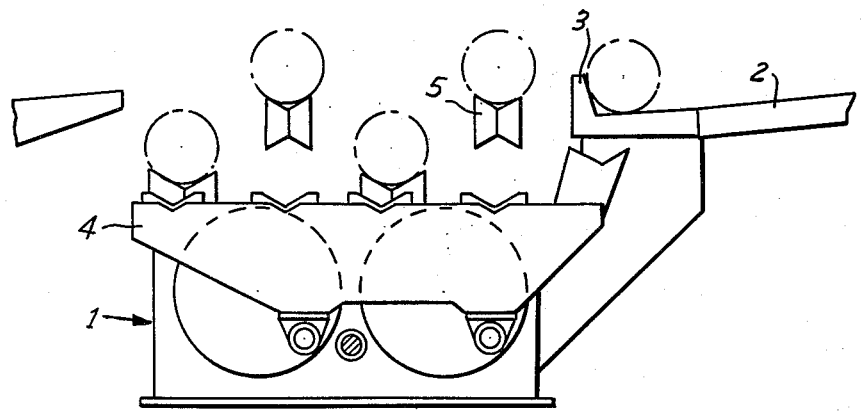
FIG. 2 is a diagrammatic cross sectional view of the structure illustrated in FIG. 1.

Referring first to FIG. 1, there is shown a transfer mechanism indicated generally at 1, having at the input side a suitable skid 2 down which pipes are fed by a suitable feeding mechanism 3 onto a row of transfer racks 4. The racks 4 transfer the pipes sideways across the length of the transfer mechanism into position for gripping by the usual holding chucks so that the latter can move the pipes endwise to position for cropping and chamfering. The transfer mechanism illustrated is such as disclosed in U.S. Letters Patent No. 2,728,327, issued on December 27, 1955, to W. L. Benninghoff et al., and is adapted for cooperation with duplicate machines at each end. For the purposes of the present invention, only the left end portion of the mechanism is shown as it forms no part of the present invention.

The racks 4 are power driven so as to orbit in an upright plane. They can be so operated that they place a length of pipe on a row of guide rollers 5 which support the pipe for movement toward a suitable machine arranged at the end of the transfer mechanism. At the ends of the transfer mechanism are the mechanisms, indicated generally at 10, which grip the end portion of the pipe, steady the end portion, cut off the end portion, and chamfer the end of the remaining length of pipe.

In order to feed the pipe to the mechanism 10, a suitable non-rotatable gripping chuck 11 is provided. The chuck 11 is arranged to receive a length of pipe and hold it concentric with the axis of the mechanism 10, as will later be explained. The chuck 11 is reciprocable endwise of the transfer mechanism and parallel to the axis of the machine by means of a piston and cylinder assemblage 12 to which pressure fluid is supplied by a suitable pump 13 driven by a motor 14. A reversing valve 15 is interposed between the pump and the ends of the cylinders and is arranged for movement to positions to lock the cylinder assemblage 12 and to admit pressure fluid to opposite ends selectively while venting the other end concurrently to a sump 16. Thus a length of pipe can be fed to the mechanism 10 and positioned endwise as desired for the purposes of cropping the end portion.

The mechanism 10 comprises a rigid frame, designated generally as 20, having a central portion or body 21 with an axial passage therethrough adapted to receive a length of pipe endwise or axially. The body 21 is fixed in circumferential position relative to the frame 20. The passage 22 is open at both ends so that a length of pipe can be fed into the forward or cutting end and the cut off crop can be discharged from the rear or discharge end.

Since the ends of the pipe quite frequently are not coaxial with the pipe, but are bent slightly out of alignment, and since sometimes the ends of the pipe are distorted so as not to be truly cylindrical, it happens that the end portion of a pipe received in the passage 22 is not coaxial therewith and all parts of its periphery are not the same radial distance from the peripheral wall of the passage 22.

The chuck 11, however, is a centering and holding chuck and grips and holds the pipe so that the zone in which the cutting is to be effected is in coaxial relation with the passage 22. Since the end portion to be cut off is not necessarily coaxial with the passage 22 and its external periphery is not necessarily cylindrical or regular, conventional jaws cannot be used for gripping and steadying the crop end portion. Instead, the mechanism of the present invention, employing a plurality of individually operable fingers 23, is provided.

Referring to FIGS. 3 through 5, the fingers 23 are in the form of individual rods. Each rod is mounted for reciprocation in an associated bore 24 in the body 21 generally transversely of the passages 22 inwardly to extended positions and outwardly to retracted positions. Each bore 24 connects with an associated enlarged coaxial bore 25 in the body 21. Each bore 25 accommodates a return spring 26 for normally urging its associated finger 23 to retracted position.

Each finger 23 has an enlarged cam head 27 with a cam surface 28 exposed outwardly away from the passage 22.

Movably mounted in the body 21 are operating devices for the fingers. In the form illustrated, the devices are arranged one to each finger 23, and each comprises an element 30 having a cam surface 31 arranged for co-operation with the cam surface 27 of its associated finger 23.

Each cam surface has a very gradual rise endwise of the body such that it can move its associated finger 23 readily inwardly to extended or pipe engaging position within the passage 22, but is self-locking against outward movement of its associated finger 23 by pressure applied outwardly at the inner end of the finger and urging the finger generally outwardly radially of the passage 22 to retracted position.

In the form illustrated, the devices 30 are in the form of slide bars which are mounted in the body 21 for sliding endwise parallel to the axis of the passage 22. Each finger 23 is provided with its own individual operating element or slide bar 30.

The fingers 23 are arranged in rows extending generally spirally of the passage 22, as illustrated. Any number of rows and any arrangement of fingers may be provided. Preferably they are uniformly distributed circumferentially and endwise of the passage 22.

In order that each finger may engage the pipe readily so as to steady the end portion accommodated in the passage 22 without gripping that portion under pressure apt to distort it, each finger is made to be moved inwardly and to lightly engage the pipe by applying light equalized operating pressure to the operating elements 30.

As mentioned, the cam surfaces of the elements 30 and fingers 23 are arranged to be self-locking so as to prevent outward movement of the fingers by force applied outwardly of the passage 22 at their inner ends.

In order to move the elements 30 for moving the fingers 23 to extended positions, and to retract the elements 30 to permit the fingers 23 to move to retracted position by the springs 26, the elements 30 are driven in the direction for moving the fingers 23 to extended position within the passage 22 by means of releasable yieldable pressure operated fluid motors. Since it is desirable that all fingers move concurrently toward extended position and grip the pipe with the same pressure, each of the elements 30 is provided with its individual motor.

In the form illustrated, each motor comprises a piston 32 connected by a suitable pivot 33 to its associated element 30. The piston 32 is reciprocable in a cylinder bore 34 formed in the body 21 and a return spring 35 is provided for returning the piston 32 and its connected element 30 to starting position.

Since it is desired that all fingers be operated concurrently, all of the cylinders 34 are connected to a manifold 36 having a passage 37 connected by passages 38, respectively, to all of the cylinders 34. Pressure fluid is supplied to the manifold 36 through a suitable pipe 39 which leads from a control valve 40 which, in turn, is connected to the output side of a motor driven pump 41. Thus, by opening the valve to connect the pump to the manifold, pressure fluid is admitted to all of the cylinders 34 and operates the pistons 32 so as to move the fingers 33 toward the extended position. Reversal of the valve disconnects the pump from the pipe 39 and connects the pipe 39 to a suitable sump 42.

The pump preferably is a very low pressure pump as the only force required is that sufficient to move the elements 30 endwise so that they cam the fingers inwardly toward extended position and into light engagement at their inner ends with the pipe. This is because the pipe is not to be held gripped under pressure apt to distort it, but is merely to be steadied. Since the fingers are held rigidly by the self locking cam surfaces from being displaced outwardly by the cropped ends, extremely light pressure is applied to the pistons.

With this arrangement, the end of a pipe can be fed into the passage 22, lightly gripped yet fixedly constrained in position regardless of its contour and axial alignment, and the operations performed thereon for cutting off the end portion accommodated in the passage 22 and for chamfering the newly exposed end.

Thereafter, the fingers can be released so that, when another section of pipe is introduced into the passage, the crop already cut off therein is removed by being pushed out by the incoming pipe. The new end portion to be cropped is then gripped by the fingers 23 and held for the cutting and chamfering operation.

In cutting off of the end portion of pipe, it is generally desirable to chamfer the exposed end of the remaining length of the pipe, both internally and externally. For this purpose, the body 21 is provided with a cutoff and chamfering device.

A rotary head 50 is mounted on the end of a sleeve 51 which is rotatably supported in the body by bearings 52 is coaxial relation to the passage 22 and in surrounding and fixed axial relation to the body 21.

Mounted in the head are a plurality of tool carriages. In the form illustrated, for carriages, designated 53, 54, 55 and 56, are employed. Since each of the carriages is essentially the same, one only will be described in detail. Each of the carriages is preferably of T-shaped cross section and is mounted in a suitable slot or guideway 58 in the head 50. Each carriage is held in its guideway 58 for radial reciprocation by means of a suitable face plate 59. Thus each carriage is mounted for radial reciprocation toward and away from the axis of the passage 22.

Each carriage carries at its inner end a suitable tool which, when the carriage is in extended position, causes engagement of the tool with the end portion of the length of pipe.

In the form illustrated, the carriage 53 carries a cut-off tool 60, the carriages 54 and 56 carry internal chamfering tools 61, and the carriage 55 carries an external chamfering tool 62. In cutting off or cropping the end of a pipe, it is generally desirable first to cut off the end, then chamfer the newly exposed end of the remainder of the length of pipe externally, and to follow this by internal chamfering or deburring. Accordingly, the carriages 53 and 55, which carry the cut-off tool 60 and the external chamfering tool 62, are arranged to move inwardly concurrently and concurrently cut off the pipe end portion and chamfer the remaining length externally.

For this purpose, a suitable rocker 65 is mounted on a pivot 66 in the head 50. This rocker has a forwardly extending arm 67 on which is pivotally mounted a suitable shoe 68. The shoe 68 is received in a notch in the rear face of the carriage 53. The other arm 70 of the rocker is pivotally connected to a link 72 which, in turn, is pivotally connected to a sleeve 73 which is coaxial with the sleeve 51. The sleeve 73 is reciprocable endwise of the sleeve 51, being supported for this reciprocation by a suitable sleeve bearing 74.

In order to connect the link 72 to the forward end of the sleeve 73, a suitable cutout 75 is provided in the forward end of the sleeve. Thus, as the sleeve 73 is moved forwardly, the rocker 65 is operated so that its arm 67 moves outwardly, thus moving the carriage 53 to retracted position. When the sleeve 73 is moved in the opposite direction, it operates the rocker 65 to move the carriage 53 inwardly to extended positions for cutting. A second rocker 65a, the same as the rocker 65, and connected in like manner to the sleeve 73 and to the external chamfering tool carriage 55, is provided. Thus, operation of the sleeve operates both carriages 53 and 55 concurrently.

In order to manipulate the sleeve 73, a suitable collar 78 is slidably mounted on the sleeve 51 in coaxial relation thereto and for movement axially thereof. Suitable windows 79 are provided in the sleeve 51 to provide access to the inner end of the sleeve 73. Blocks 80 are fixedly connected to the collar 78 and are slidable endwise in the windows 79 and, at their inner end, are securely fastened to the sleeve 73. Thus, upon movement of the ring 78 axially in opposite directions, the sleeve 73 is moved in axially opposite directions.

The collar 78 is engaged by suitable sets of rollers 83 so that it can be moved axially of the sleeve 51 during its rotation. The sets of rollers 83 are carried on rocker arms 84, respectively, which are pivotally connected to a rocker 85. The rocker 85 is pivotally connected by pivots 86 to the frame 20. Thus, upon rocking of the rocker 85, the collar 78 can be shifted axially.

The rocker 85 is provided with a suitable yoke 87 in which is a slidable block 88 connected by a pivot 89 to a piston 90 operable in a cylinder 91.

Fluid pressure can be admitted to either end of the cylinder selectively, as desired, for shifting the collar 78 in opposite directions. Thus, by operation of the piston 90, the carriages 53 and 55 can be moved to extended and retracted positions, selectively, concurrently.

In order to move the carriages 54 and 56 in the opposite directions from the carriages 53 and 55, concurrently with the movement of the latter, suitable rockers 92 are provided. Since the rockers are the same in form and function, only one rocker will be described in detail. The rocker for cooperating the carriage 53 and the carriage 54 is indicated at 92. The rocker 92 is connected by a suitable pivot 93 to the head 50 so as to rock about an axis extending generally endwise of the passage 22. One arm 94 of the rocker 92 is pivotally connected to a shoe 95 which is disposed in a cavity 95a in the side of the carriage 53. The other arm 96 of the rocker 92 is provided with a corresponding shoe 97 which is pivotally connected thereto and received in a cavity 97a in the carriage 54. It is apparent that when the carriage 53 is moved inwardly by the operating mechanism heretofore described, the rocker 92 concurrently moves the carriage 54 outwardly and vice versa. The carriage 55 is correspondingly connected by similar rockers 98 and 99, respectively, to the carriage 54 and carriage 56, respectively. The carriage 53 is correspondingly connected by a similar rocker 100 to the carriage 56. Thus, as the two carriages 53 and 55 move inwardly the carriages 54 and 56 move outwardly, concurrently, and vice versa.

This arrangement has an additional advantage. The carriages usually are, or can be made, the same in size, shape, and weight. Hence, since carriages 53 and 55 in all positions are equidistant from the rotational axis, and the carriage 54 and 56 likewise, in all positions are equidistant from the axis, there is no unbalanced rotating weight tending to cause vibration of the rotary head 50.

Furthermore, since the carriages 53 and 55 are heavier than the carriages 54 and 56, and the distance of movement of the carriages 53 and 55 radially is different than and opposite to, but proportional to, the movement of the carriages 54 and 56, the total moment of inertia about the rotational axis remains substantially constant for a given rotational velocity of the head 50 as the carriages are caused to advance and recede to perform their functions. Heretofore, this balance of weight and constancy of moment has been obtained only by the use of counterbalances which perform a counterbalancing function only, as disclosed, for example, in United States Patent No. 2,112,396, issued March 20, 1938, to Corrigan, and United States Patent No. 2,619,174, issued November 25, 1952, to Neale.

Thus all four rockers, together with the carriers 54 and 56, connect the carriers 53 and 55 together and provide means for constraining the carriers 53 and 55 to be at all times equidistant from the axis of rotation. Also, all four rockers, together with carriers 53 and 55, connect the carriers 54 and 56 together and provide the means for constraining the carriers 54 and 56 to be at all times equidistant from the axis of rotation.

Again, the rockers and carriages 53 and 55 provide part of the driving means for driving the carriages 54 and 56. Thus the same elements perform several separate and distinct functions. While the multi-function performance of several elements is preferred, as it greatly simplifies the structure, the invention in its broader aspects, is not to be held limited to the preferred form, but to include structures in which each of the several functions is performed by separate and distinct means.

Any suitable means may be provided for driving the head 50. Preferably, this is by means of a suitable gear 102 rigid with the sleeve 51 and driven by a gear 103. The gear 103 is driven through a suitable reduction mechanism 104 by a motor 105. However, any desired drive may be employed, depending upon the particular operation desired.

In many instances it is desirable that the cut off end portion of a length of stock be withdrawn promptly endwise of the stock from the cutting tool to prevent its interferring with or damaging the tool at the instant of severance. Accordingly, the mechanism too is arranged to yieldably urge the gripped end portion of the stock away from the cutting tool.

For this purpose, the body 21 is slidably mounted in the frame 20 for axial movement relative thereto. The frame 20 is provided with a plurality of cylinder bores 106 which are parallel to the body axis in which are pistons 107, respectively. The pistons have rods 108 which are connected to the body 21 for movement therewith axially of the body. Preferably four such cylinders are provided and they are connected in parallel in a hydraulic circuit. Each cylinder is connected at opposite sides of its piston to pipe lines 109 and 110 which are connected to a reversing valve 111. The reversing valve is connected to the pump 41, a suitable pressure regulating valve 112 being interposed in the circuit between the pump 41 and the valve 111. The valve 111 may be remotely controlled by a solenoid 113, if desired.

Thus, after the pipe end portion has been engaged by the fingers 23, fluid pressure may be admitted to the cylinders 106 to yieldably urge the piston rods to extended position and thereby to yieldably urge the body 21, with the pipe held thereby, away from the cut-off tool.

As mentioned hereinbefore, the fingers are primarily only supports and do not necessarily grip the pipe firmly, but due to irregularities in the shape and surface of the pipe, they can impart a light axial tension to the pipe so that, just as the cut-off tool severs the end portion of the pipe, the end portion is moved a slight distance axially out of the path of the cut-off tool. Since the cut off end portion of the pipe is supported, this movement protects the tool from damage by the severed end portion of the pipe.

While I have disclosed a form of holding mechanism adapted for telescopically interfitting with the exterior of the stock, the principles can readily be incorporated in a like mechanism adapted for telescopically interfitting with the interior of the stock without departing from the principles of the invention.

The operation is as follows:

A length of pipe is fed to the desired endwise position and gripped by the chuck 11. The chuck 11 then is moved by the piston and cylinder assemblage 12 to position endwise so that the location at which the cut is to occur is disposed in radial alignment with the tools 60 through 63. In this position, the end portion to be cropped is disposed in the passage 22, extending entirely therethrough and therebeyond if necessary. The chuck is then stopped and held in fixed position, and equalized pressure is admitted to the cylinders 34, concurrently. Thereupon the pistons 32 operate the elements 30 to move the fingers 23 inwardly of the passage 22 into light engagement with distributed surface areas of the end portion of the pipe. The cams on the fingers 23 self lock and prevent movement of the fingers outwardly by any force applied to their inner ends by the pipe so long as the pistons retain the elements 30 in the last mentioned position. Light tensioning force is then applied to the body 21 by the pistons 107 so as to urge the body 21 axially away from the cut-off tool 60.

While the fingers are in this position, the head 50 is rotated and, by means of the assemblage 91, the cut-off tool 60 and the external chambering tool 62 are caused to cut off the end portion of the pipe held by the fingers, and chamfer externally the newly formed end. Instantly upon severance of the end portion, it is withdrawn axially a short distance from the path of the tool 60. Next, the chuck 11 is operated to withdraw the pipe a short distance from the head 50. Thereupon, the carriages 53 and 55 are withdrawn, causing the carriages 54 and 56 to move inwardly and carry the internal chamfering tools to the proper position. When these are in proper position, the chuck 11 is again operated to move the pipe axially toward the head 50 to cause engagement of the two internal chamfering tools with the internal periphery of the length of pipe at the end newly exposed by the cut-off operation, thus removing any internal burrs and providing an internal chamfer.

It is apparent, therefore, that with the present structure the pipe can be moved into position for cropping and the end portion to be cropped can be held and steadied regardless of whether it is out-of-round or irregular in external cross section or out of axial alignment. The end to be cropped is held steady due to the self-locking features of the cams on the fingers 23 and elements 30 so that it cannot be moved during the cropping operation, but is removed instantly upon severance. During the cropping operation, the pipe is chamfered externally. Then it is moved to position for chamfering internally and internally chamfered. Next, it is transferred by the transfer mechanism 2 to a point of discharge, the fingers 23 meanwhile having been released after the finish of the cutting operation.

The next pipe is fed into the mechanism 10 in like manner and engages the cut-off or cropped end in the passage 22 and pushes it out of the rear of the passage 22.

Having thus described my invention, I claim:

1. A mechanism for steadying the crop end portions of elongated stock during cutting off thereof and comprising a body adapted to be telescopically related with the crop end portion by relative endwise movement of the body and crop end portion, a plurality of fingers carried by the body and spaced from each other peripherally and longitudinally of the body, means supporting the fingers for movement transversely of the body toward and away from the mid-portion thereof to extended and retracted positions, respectively, independently of each other for engaging concurrently one end of each with the peripheral walls of the telescopically related crop portion of the stock, operating devices respective to the fingers, each device being movably mounted in the body and operative when moved in one direction to move its associated finger toward extended position for engaging the crop portion under yieldable pressure insufficient to cause distortion of the sound portion of the stock, each said device being rigidly mechanically self-locking against return movement in the retracting direction by reactionary force applied in the retracting direction to said one end of its associated finger for thereby preventing lateral displacement of the crop portion, yieldable power means drivingly connected to the devices, respectively, and operable to move the devices in said one direction for driving their associated fingers independently of each other to effect said engagement of each, and to return the devices to starting position, means to return the fingers to starting position upon return operation of the devices, and means for equalizing the power supplied to the power means thereby to equalize the forces applied to the fingers, respectively.

2. A mechanism according to claim 1 wherein the power means urge the fingers toward extended position under pressure causing equalized pressure engagement of the fingers with the crop portion insufficient to cause the fingers to elastically deform the sound stock appreciably.

3. A mechanism according to claim 1 wherein said one direction is lineal and endwise of the body, each device has a cam surface, each finger has a complementary surface in engagement with that on its associated device, the rise of each cam surface is sufficiently small in proportion to its length to be self-locking against displacement by reactive forces applied to the fingers in the retracting direction, and the power means are piston and cylinder assemblages connected to the devices, respectively, for driving them lineally in said one direction.

4. A mechanism for steadying the ends of elongated stock during cropping and comprising a hollow body having a passage therethrough which is open at both ends and is adapted to receive the elongated stock endwise from one end for cropping an end portion and to permit the crop to be discharged from the other end, a plurality of fingers carried by the body and extending into the passage and movable independently of each other transversely of the passage toward and away from the mid-portion thereof to extended and retracted positions, respectively, said fingers being spaced from each other endwise of, and peripherally of, the passage, and adapted to engage at their inner ends the periphery of the end portion of the stock in the passage, operating elements respective to the fingers, each element being movably mounted in the body and operative when moved in one direction to move its associated finger toward extended position, yieldable power means drivingly connected to the elements, respectively, and operable selectively to yieldably move the elements in said one direction independently of each other so as to effect engagement of the inner ends of the fingers with the crop end portion of the stock concurrently with pressure insufficient to distort the sound stock, each said element being rigidly, mechanically self-locking against return movement in the retracting direction by reactive forces applied to the inner end of its associated finger in the retracting direction for preventing lateral displacement of the crop end portion while it is held under said pressure, and to return the elements to starting position for releasing the fingers, means to return the fingers to starting position upon their release of the elements, and means for causing the yieldable power means to equalize the forces applied to the fingers, respectively.

5. In a mechanism for steadying an end portion of a length of stock during cropping, a gripping chuck adapted to firmly grip and fixedly hold the stock against the force of a cutting tool during severing of the crop end portion, a holding mechanism adapted to grip the crop end portion of the stock and prevent lateral displacement of the stock, said chuck and holding mechanism being spaced apart endwise, whereby a cut-off device can be inserted between the chuck and mechanism at a fixed location endwise of the gripped stock, means supporting the holding mechanism for movement along a path endwise of the stock away from the chuck and from said location, and means operable during the gripping operation of the gripping chuck and holding by the holding mechanism yieldably urging the mechanism along said path away from the chuck and from said fixed location.

References Cited in the file of this patent

UNITED STATES PATENTS

| | | |
|---|---|---|
| 315,395 | Dupont | Apr. 7, 1885 |
| 2,186,061 | Berg et al. | Jan. 9, 1940 |
| 2,427,167 | Thompson et al. | Sept. 9, 1947 |
| 2,484,601 | Abbey | Oct. 11, 1949 |
| 2,616,325 | Abbey | Nov. 4, 1952 |
| 2,697,610 | Ovshinsky | Dec. 21, 1954 |
| 2,782,488 | Anderson | Feb. 26, 1957 |
| 2,810,326 | Bowen | Oct. 22, 1957 |
| 2,894,582 | Long | July 14, 1959 |
| 2,948,540 | Garberding | Aug. 9, 1960 |

FOREIGN PATENTS

| | | |
|---|---|---|
| 19,818 | Great Britain | July 26, 1893 |